Sept. 3, 1946. C. F. SIEVERS 2,406,914
DISPENSING NOZZLE, VALVE, AND VALVE DISK FASTENING MEANS
Filed Aug. 16, 1943

INVENTOR
C.F. SIEVERS
BY Hudson Young & Ginger
ATTORNEYS

Patented Sept. 3, 1946

2,406,914

UNITED STATES PATENT OFFICE 2,406,914

DISPENSING NOZZLE, VALVE, AND VALVE DISK FASTENING MEANS

Carl F. Sievers, Pontiac, Mich., assignor to Phillips Petroleum Company, a corporation of Delaware Application August 16, 1943, Serial No. 498,795

1 Claim. (Cl. 251—135)

My invention relates to valves and it has particular relation to simple thumb pressure operated fluid valves, and more particularly to valves in dispensing nozzles.

Considerable difficulty has been experienced in the prior art in making a simple and effective valve for control of fluids under pressure. In the filling of cylinders with gas a simple and foolproof dispensing valve is essential. If the valve develops leaks, valuable gas will be wasted between the times that cylinders are filled.

Devices have been proposed in which an element goes through the sealing material of the valve head thus creating the problem of sealing around the element. Complicated arrangements of washers, screw-threaded shanks, nuts, locknuts and cotter pins have been devised, but these additional parts only serve to distort the sealing washer so that leaking occurs around the seat and the danger of parts coming loose is aways present.

One object of my invention is to provide the simplest type valve possible consisting of an operating member and a sealing member.

Another object of my invention is to provide the simplest possible connection between the operating and sealing member.

Another object of my invention is to provide a valve in which the sealing member on its seat positively seals against the escape of fluid, in which there are no passages through the sealing member, and in which the operating member is on the low pressure side of the sealing member to obviate leakage.

Another object of my invention is to provide a cylinder filling valve which is thumb operated, has a manipulating handle, and is provided with a conical nozzle to cooperate with a conical sealing surface in the cylinder to be filled.

Numerous other objects and advantages of my invention will be apparent to those skilled in the art from reading the specification and claim and studying the drawing.

Figure 2:
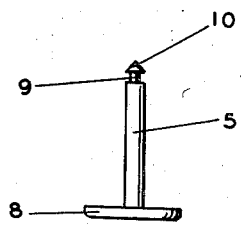
Figure 2 is an elevational view of the thumb actuated valve actuating member 5 of Figure 1.
Figure 1:
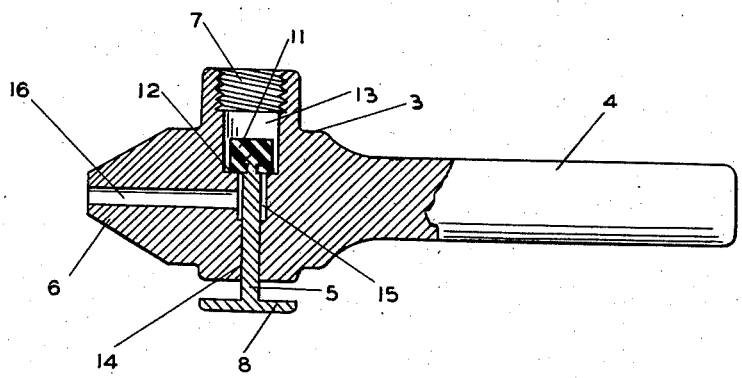
Figure 1 is an elevational view partially in cross section of an illustrative embodiment of my valve.

In Figure 1, a valve body 3 is provided with a handle 4 designed to be gripped by the fingers of one hand, a thumb actuated valve actuating element or valve stem 5 and a conical sealing surface 6. A source of fluid (not shown) preferably comprising a flexible element (not shown) is connected to body 3 by screw threaded connection 7. Thumb actuated member 5 is provided at one end with a thumb push button 8, and at the other end with a reduced diameter portion 9 and a spear head 10. A rubber valve head 11 is made out of a block of rubber, or similar resilient material such as neoprene, the composition depending upon the chemical and physical character of the fluid to be controlled. Resilient valve head 11 is provided with a hole located in the center of one side which is deep enough to receive the cone-shaped spear head 10 whereby the valve head is held in place on the end of valve stem 5.

The method of assembly consists of placing head 11 on seat 12 at the bottom of passage 13 and holding it there with a small stick while pushing actuator 5 in through guide opening 14. Spear head 10 enters the opening in head 11 and becomes secured thereto. The shape of the opening in head 11 which will best cooperate to form a permanent grip on spear head 10 depends largely on the material employed in making 11. When employing rubber, I preferably form the opening in head 11 with a flange and an enlarged opening interiorly of the flange to fit parts 9 and 10 exactly, the flange going in the space at 9 below the overhang of the spear head 10. In other materials such as cork it is unnecessary to have any preliminary hole in head 11 but merely to have spear head 10 make its own hole and create its own flange to cooperate with part 9. With other materials a hole not quite as big as 9 and 10 should be provided so that spear head 10 may enter easily by displacing and compressing the material and take a firm grip. The type of hole in head 11 can be readily determined by simple non-inventive experiments with the material it is desired to use. When the hole in the valve head is preformed the spear head 10 need not be as sharp as when the spear head forms its own hole.

The operation of the device is as follows:

High pressure fluid from a source (not shown) comprising a preferably flexible hose (not shown) attached at 7 enters through passages 7 and 13 and presses valve head 11 to seat 12. When it is desired to fill a cylinder, the operator grasps handle 4 with his four fingers of one hand and presses conical nozzle 6 into a corresponding conical opening (preferably lined with resilient sealing material) in the cylinder to be filled. The operator then presses button 8 preferably with the thumb with the same hand that is gripping handle 5. This pushes valve 11 off of seat 12 and the fluid from passage 13 passes through passage 15 and passage 16 to the cylinder (not shown) which is being filled. Leakage of fluid around the valve stem 5 is minimized to negligible amount by the close fit of body 3 at surface 14 to the stem 5.

Obviously some changes in shape and proportion of parts of handle 4, comb 6, button 8, head 11, spear head 10 and related parts may be made without departing from the spirit of my invention which is limited only by the scope of the following claim.

While I have shown my valve as applied to a dispensing nozzle, it obviously is useful in all types of work where fluid valves are employed, for example, air valves, torch valves and relief valves.

Having described my invention, I claim:

A poppet valve for controlling flow of a fluid under pressure from a source of such fluid comprising in combination a valve body having a conduit with an inlet and an outlet, a valve seat formed in said conduit, said conduit being divided by said valve seat into a low pressure portion between said seat and said outlet and a high pressure portion between said seat and said inlet, a unitary valve stem of rigid material, a unitary cylindrical valve head of resilient material, connecting means between the stem and the valve head comprising a spear head formed as an integral part of said stem, said spear head projecting part way through said valve head along the axis of said cylindrical valve head, said valve head being disposed in said high pressure portion of said conduit with said valve stem extending into said low pressure portion of said conduit, said valve seat being disposed entirely in a plane which is parallel to the plane of the adjacent plane end of said cylindrical valve head, and said valve head sealing against said valve seat along a plane annular zone adjacent the circumference of the face of said cylinder that is disposed around said valve stem, whereby the pressure of the fluid in said high pressure portion of said conduit acts to increase the sealing action between said valve head and said seat, and whereby said valve head is normally free of pressure by said spear head tending to split said valve head during the long periods of time said valve head is held against said seat, said fluid pressure against the top of said cylindrical valve head being normal to said sealing portion of said valve head and said valve seat, whereby forces tending to distort or flow the material of said valve head are minimized.

CARL F. SIEVERS.